US005140171A

United States Patent [19]

de Janasz

[11] Patent Number: 5,140,171

[45] Date of Patent: Aug. 18, 1992

[54] VEHICLE OPERATED REMOTE CONTROL ACCESS SYSTEM

[76] Inventor: Christopher G. de Janasz, 20011 Bellemarc Ave., Torrance, Calif. 90503

[21] Appl. No.: 548,374

[22] Filed: Jul. 3, 1990

[51] Int. Cl.[5] .......................... B60Q 9/00; B60Q 11/00

[52] U.S. Cl. .......................................... 307/10.8; 49/25; 49/199; 341/176

[58] Field of Search ............... 307/10.8, 101; 340/525, 340/457.2, 638, 309.15, 459, 825.06, 827; 315/77, 82, 83; 49/197, 200, 25; 341/176

[56] References Cited

U.S. PATENT DOCUMENTS 4,496,942 1/1985 Matsuoka ............................ 340/696

*Primary Examiner*—A. D. Pellinen
*Assistant Examiner*—Aditya Krishnan
*Attorney, Agent, or Firm*—Robert J. Schaap

[57] ABSTRACT

A vehicle operated remote control access system for obtaining access to a controlled environment using the headlight system of a vehicle having a high beam operation and a low beam operation. The remote control access system comprises a switching sensor circuit for detecting a sequence of switching from a low beam to a high beam operation or from a high beam to a low beam operation of the vehicle. Two or more of these switching sequences may be employed in the present invention. A timing means is provided with the circuit in order to determine if a switching sequence from a low beam to a high beam operation and then from a high beam operation back to a low beam operation, and possible with a second sequence of back to high beam and then low beam operation, occurred within a predetermined time interval. If the one or more required switching sequence did occur in this time interval, then the remote control system is energized to open a gate or a door. If the switching from the low beam to the high beam and back to the low beam did not occur within the predetermined time interval then no energization of the remote control system will occur and the system resets to neutral.

20 Claims, 3 Drawing Sheets

VEHICLE OPERATED REMOTE CONTROL ACCESS SYSTEM

BACKGROUND OF THE INVENTION

1. Field of the Invention

This invention relates in general to certain new and useful improvements in vehicle operated remote control systems and more particularly, to vehicle operated remote control systems which utilize the headlight system of a vehicle having a high beam and a low beam operation by switching therebetween.

2. Brief Description of the Prior Art

Remote access opening, such as garage door and gate opening from automotive vehicles has become very popular and various remote access systems are now in widespread use. Most of the conventional remote control access systems utilize a garage door or a gate opener which is controlled by a radio frequency beam emitted from a transmitter located within the vehicle.

Essentially all of the conventional remote control access systems now in use employ a hand-held remote control transmitter which is operated to cause the opening or closing of the garage door or gate when the vehicle is located within proximity to the opener.

One of the significant problems with the present commercially available remote control access systems is the fact that a hand-held transmitter is required for accessing the gate or door. Frequently, these hand-held remote control units are either clipped to a sun visor of the vehicle or stored in the glove compartment or otherwise placed in some other unobtrusive location. However, in many cases they are misplaced and the user of the remote control system must then conduct a search of his or her vehicle in order to locate the hand-held transmitter.

In addition to the foregoing, there is the ever present problem of theft of the remote control transmitter. Since the remote control transmitter is, in effect, a key, theft of this device would enable a thief to obtain access to the controlled area. If the thief or potential thief knows of the location of the controlled access area, then such thief could on occasion lift the transmitter from the vehicle and use the same on a subsequent occasion.

It would be desirable to provide a remote control system which enables access to a controlled area and which is not visible from the exterior of the vehicle and also cannot be readily removed from a vehicle.

OBJECTS OF THE INVENTION

It is, therefore, one of the primary objects of the present invention to provide a vehicle operated remote control access system which enables a driver of a vehicle to obtain access to a controlled area utilizing the headlight system of the vehicle.

It is another object of the present invention to provide a remote control access system of the type stated which utilizes a sensing of a switching sequence between a low beam and a high beam operation of the vehicle for energizing a remote control system.

It is a further object of the present invention to provide a remote control access system of the type stated which utilizes a sensing of one or more sequences of switching from a low beam to a high beam operation and back from the high beam to a low beam operation within a predetermined time period in order to energize a remote control system.

It is an additional object of the present invention to provide a vehicle operated remote control access system which is affixed to the vehicle, connected to and operable through circuitry of the vehicle, and is not observable as a remote control access system from the exterior of the vehicle.

It is still a further object of the present invention to provide a vehicle operated remote control access system of the type stated which can be manufactured at a relatively low cost but which is highly efficient in operation and which can easily be installed in the headlight system of the vehicle.

It is another salient object of the present invention to provide a method of remotely controlling access to a controlled area with the headlight system of a vehicle.

With the above and other objects in view, my invention resides in the novel features of form, construction, arrangement and combination of components presently described and pointed out in the claims.

BRIEF SUMMARY OF THE INVENTION

An apparatus for performing a remote function using the headlight system of a vehicle which has a high beam operation and a low beam operation. Typically, the conventional automotive vehicle is provided with some passenger compartment switching mechanism enabling a switching from the high beam to the low beam operation, usually by manual control by the operator of the vehicle.

The apparatus of the present invention is typically referred to as a vehicle operated remote control access system since it enables a controlled access to a controlled area. The controlled area may adopt the form of a parking lot, a garage or the like. In any event, the controlled area is typically provided with a gate or door which must be unlocked and opened in order to enable access for the vehicle and occupants.

The remote control system of the present invention utilizes a conventional transceiver operation normally employed in most conventional remote control systems. In other words, the transmitter and receiver operation is similar to that of a conventional unit. However, in the present invention, the mechanism for causing the switching and energization of the remote control system utilizes the headlight high beam and low beam system of the vehicle.

In accordance with the present invention, there is provided a circuit for detecting a switching between the low beam and the high beam condition of the vehicle. Thus, if the vehicle operator desires to obtain access to the controlled area, he or she will initiate a switching sequence from a low beam condition to a high beam condition of the vehicle and back to a low beam condition within a predetermined time period. If the switching sequence, that is from low beam to high beam and high beam to low beam, occurs within the predetermined time period the remote control system will be operated. Contrariwise, if the switching sequence does not occur within the predetermined time period the remote control system will not be energized and will reset to its "neutral" or normal position.

In one of the more preferred embodiments of the present invention, one or more switching sequences are used such that there is a switching from a low beam to a high beam and back to a low beam constituting a first sequence and a second sequence of switching back to the high beam and to the low beam. Two switching sequences are employed so as to avoid any inadvertent energization of the remote control system. In addition, two switching sequences are preferred in order to avoid potential problems with governmental agencies regulating radio frequency transmission.

In still another preferred embodiment of the present invention, the apparatus comprises a circuit having a low beam detecting mechanism means for detecting a low beam or a high beam operation of the headlight system of the vehicle. The circuit is also provided with means for detecting a switching to the other of the high beam or low beam operation of the vehicle.

A timing means is located in the circuit to determine if the switching sequence occurred in a predetermined time period. If the switching did occur in the predetermined time period, the timing means will cause the generation of a remote control output signal. This remote control output signal will thereupon operate the receiver and the opener of the gate or door.

The apparatus of the invention is also provided with means for interposing the circuit between the electrical system of the vehicle and the headlight system to enable the circuit to be powered by the electrical system of the vehicle to generate a remote control output signal for operation of the remote control equipment.

The circuit of the invention utilizes various circuit chips for detecting the switching operation and for also providing the timing function necessary for the operation of the system.

This invention possesses many other advantages and has many other purposes which will be made more clearly apparent from a consideration of the forms in which the invention may be embodied. One of the preferred forms of the invention is illustrated and described in the following detailed description of the invention. However, it is to be understood that this detailed description is set forth only for purposes of illustrating the general principles of the invention and is not to be taken in a limiting sense.

BRIEF DESCRIPTION OF THE DRAWINGS

Figure 1:
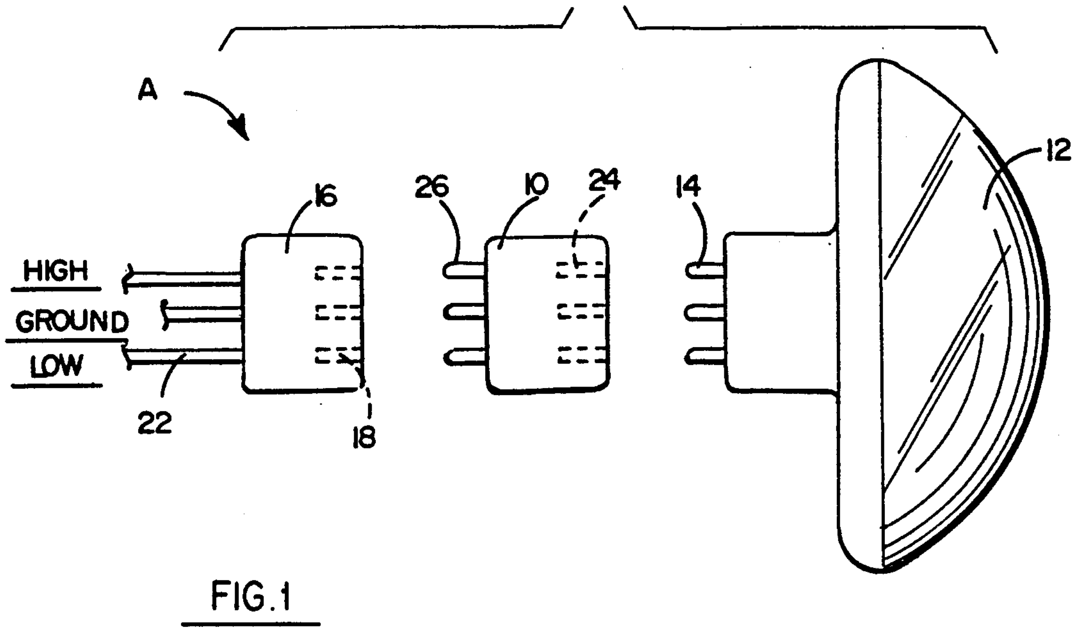
Figure 3:
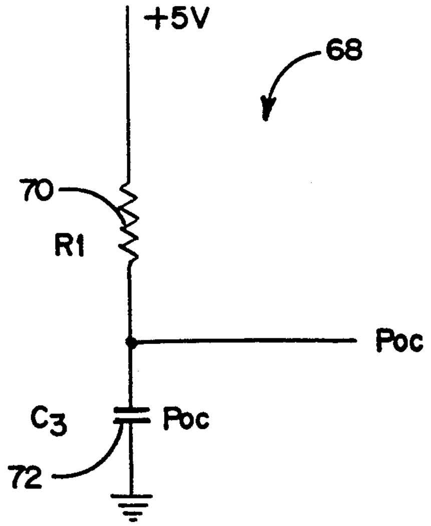
Figure 2:
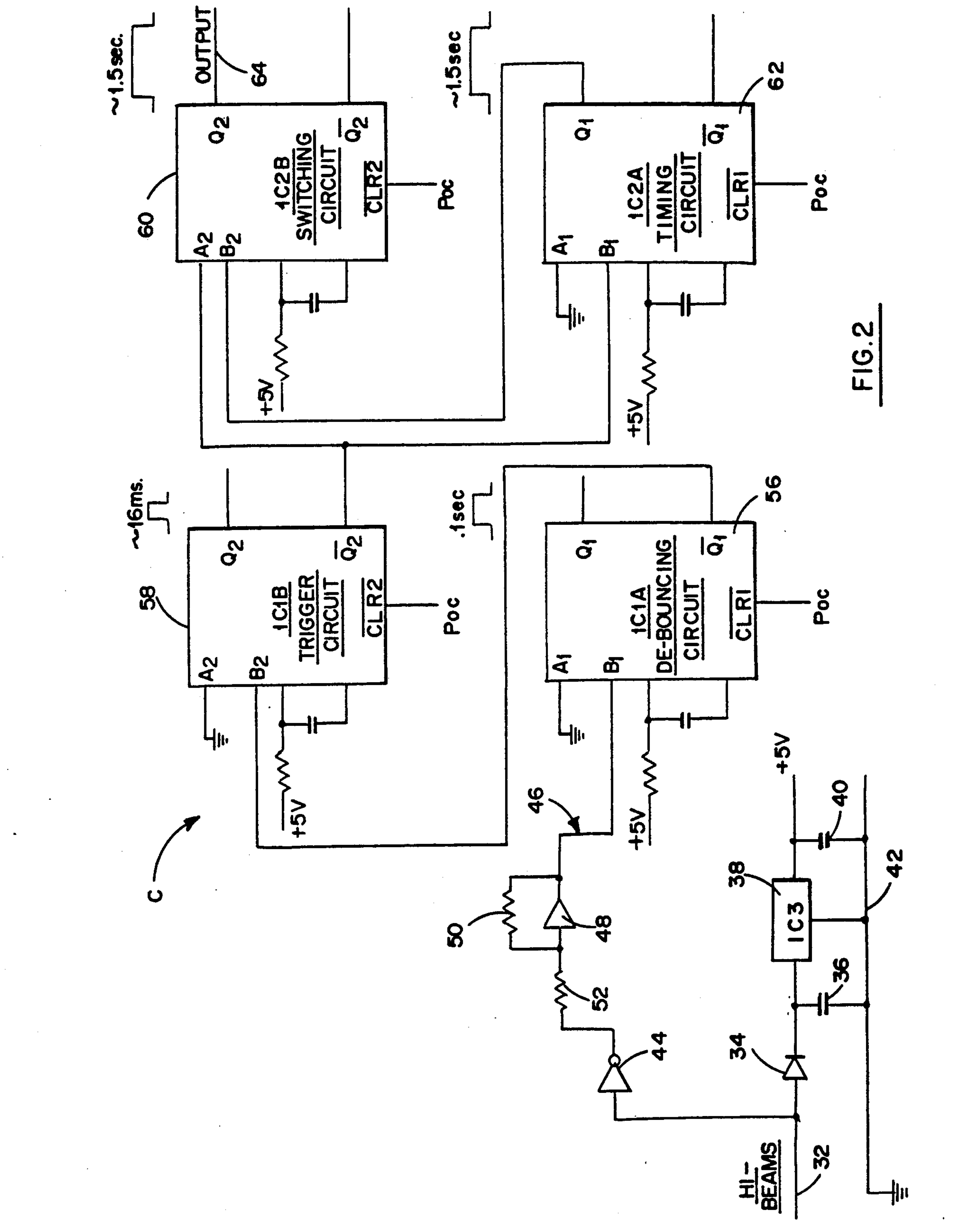
Figure 4:
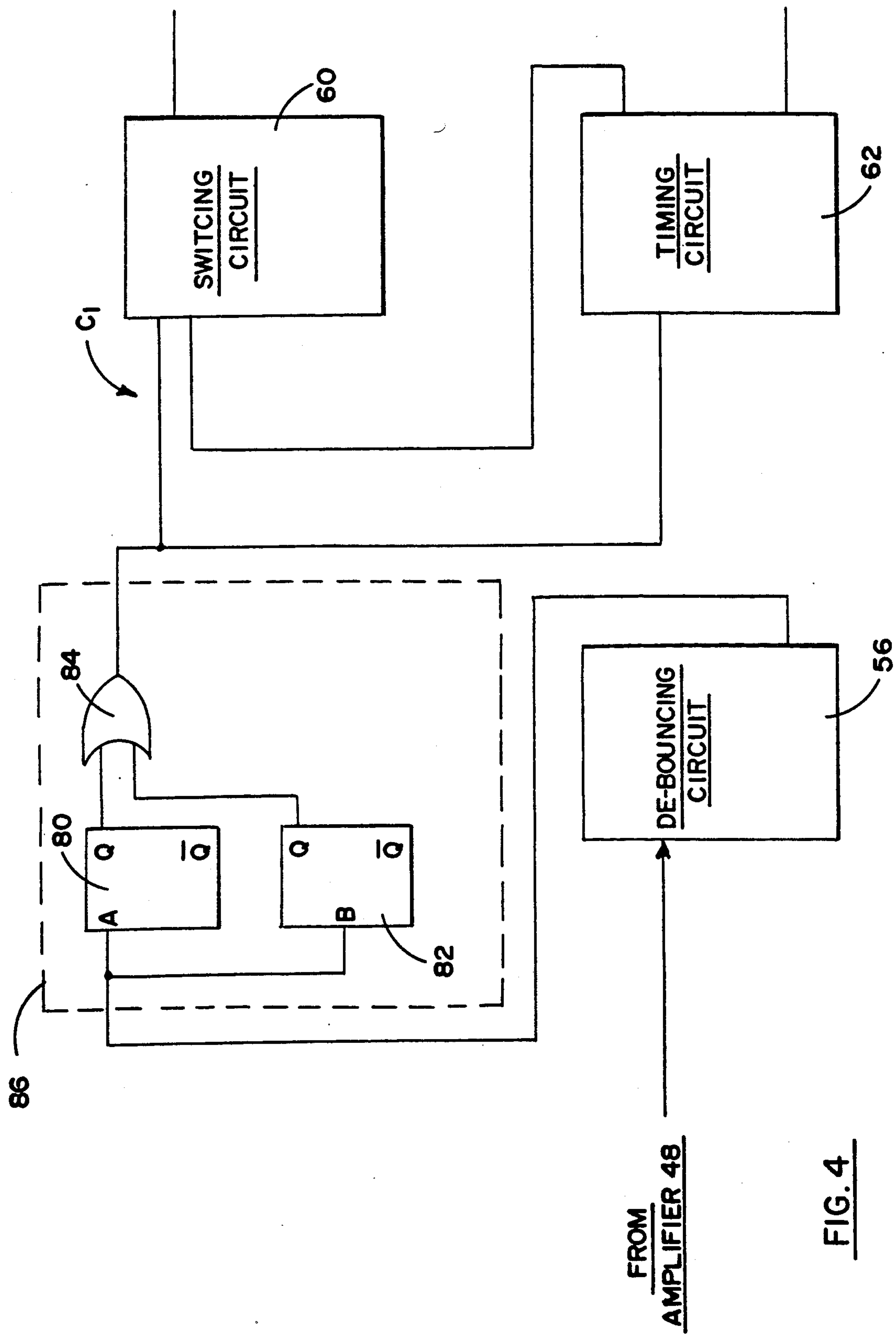

Having thus described the invention in general terms, reference will now be made to the accompanying drawings (three sheets) in which:

FIG. 1 is a schematic side elevational view of a vehicle operated remote control access system showing the interposition between the electrical system and the headlights of a vehicle;

FIG. 2 is a schematic circuit diagram showing the control circuit used in the apparatus of the present invention;

FIG. 3 is a schematic circuit view of an initializing circuit used with the control circuit of FIG. 2; and FIG. 4 is a schematic circuit view of a modified embodiment of a control circuit used in the apparatus of the present invention.

DETAILED DESCRIPTION OF A PREFERRED EMBODIMENT

Referring now in more detail and by reference characters to the drawings which illustrate a preferred embodiment of the present invention, A designates a vehicle operated remote control access system used in conjunction with the electrical system and the headlight system of an automotive vehicle In the embodiment of the invention as illustrated in FIG. 1, it can be observed that the remote control access system is incorporated within a single electrical connector 10.

The headlight system of the vehicle conventionally includes headlights 12 mounted within the body of the vehicle. These headlights have electrically conductive pins 14 for connection to a plug 16. The plug 16 is provided with pin receptacles 18 for receiving the conductive pins 14 on the head lamp 12 of the vehicle. In this way, the headlight 12 can easily be removed by pulling the conductive pins 14 from the receptacle 18 when it is necessary or desirable to change the headlight of the vehicle.

The plug 16 is connected to electrical conductors 22 which are, in turn, connected to the electrical system of the vehicle. However, the remote control access system actually can become an integral part of the vehicle by being connected to and operable through the electrical circuitry of the vehicle.

The connector 10 forming part of the remote control access system is provided with receptacles 24 which receive the conductive pins 14 on the headlight 12. Thus, the connector 10 is provided with pins 26 which extend into the receptacles 18 on the plug 16. Thus, the connector 10 becomes easily and conveniently interposed both physically and electrically in the electrical circuitry of the vehicle.

In this way, the head lamps 12 are powered by the electrical system of the vehicle. Moreover, operator controls located within the passenger compartment of the vehicle are provided to enable the operator of the vehicle to turn the headlights on and off. Moreover, the operator compartment of the vehicle is also provided with a switching mechanism for switching between high beam and low beam operation of the headlights 12.

The connector 10 of the remote control access system of the present invention is easily and conveniently interposed between the headlight 12 and the plug 16 as shown. Thus, the remote control access system can be easily installed or easily removed if desired thereby essentially eliminating any time consuming or expensive installation. The three conductors 22 as shown in FIG. 1 include a high beam conductor, a low beam conductor and a ground conductor.

As indicated previously, the remote control access system of the present invention can operate with a single switching from a low beam to a high beam and back to a low beam switching sequence. In still a more preferred embodiment, the remote control access system utilizes two sequences with one immediately following the other. Thus, these two sequences include initially switching from a low beam to a high beam and back to a low beam for the first sequence and then switching back to the high beam and then the low beam for the second sequence. In this way, by arranging a pair of switching sequences, it is possible to eliminate possibilities of inadvert accessing of the control system with a simple use of the head lamp system. In most cases, the head lamp system would be switched from low beam to high beam or from high beam back to low beam while in a condition remote to the receivers of the access system. However, this low beam to high beam switching could occur in proximity to the receiver of the access system and by using a pair of switching sequences, any inadvertent accessing would be avoided. In addition, and in order to overcome certain governmental regulations, it may be desirable to employ a pair of sequential switching sequences in order to access the remote control system.

The circuit which is illustrated in FIGS. 2 and 3 of the drawings, as hereinafter described, is therefore designed for use with a remote control access system which utilizes a pair of sequential switchings.

The remote control access system of the present invention utilizes a circuit C which is more fully illustrated in FIG. 2 of the drawings. The voltage from the high beam circuit of the automotive vehicle is received over a conductor 32, which is connected to the electrical circuitry of the vehicle. This voltage is passed through a diode 34 and used to charge a capacitor 36. The input across the capacitor 36 is about 11 to 12 volts. The voltage across the capacitor 36 is regulated by an integrated circuit 38 which functions as a voltage regulator. This capacitor 36 is used to charge a capacitor 40 and the integrated circuit 38 limits the charge on the capacitor 40 to five volts. In the arrangement as illustrated, it can be observed that the capacitors 36 and 40 are isolated by the circuit 38 and both are connected between the conductor 32 and a ground line 42. In this case, the ground line may be connected to the floating ground of the vehicle.

The diode 34 prevents the capacitor 36 from discharging when the high beam conductor 32 has no signal. In this case, when the high beam of the vehicle is turned off, no signal will exist on the conductor 32 but the capacitor 36 will not discharge.

The signal on the high beam conductor 32 is also passed through a buffer 44, in the form of an integrated circuit chip, and introduced into a noise protection circuit 86 which is comprised of an amplifier with a feed back resistor 50 connected thereacross and having an input resistor 52 connected to the input of the amplifier 48. This noise protection circuit will allow protection from mechanical contacts on the high beam switches of the automotive vehicle.

The output of the noise protection circuit 46 is introduced into a debouncing circuit 56 which is also in the form of an integrated circuit chip. The buffer 44 is used to convert the high beam input to a voltage level of zero to five volts. The debouncing circuit 56 actually operates as a type of filter and precludes any error signal from being included in a signal which triggers a trigger circuit 58. The debouncing circuit 56 eliminates problems arising from closing a mechanical contact.

The output pulse from the trigger circuit 58 is introduced into an A2 input of the switching circuit 60 and also into the B1 input of a timing circuit 62. Thus, an output pulse from the trigger circuit 58 will actually trigger the switching circuit 60 and initiate the timing circuit 62.

If the pulse from the trigger circuit 58 is the first trigger pulse, the output from the timing circuit 52, which is a Q1 output 64, is a logical zero. This will prevent the switching circuit 50 from triggering. When a second trigger signal from the trigger circuit 58 occurs, the output from the timing circuit 62 at the output 64 will be a logical one if the second trigger signal occurred within a predetermined time period. Assuming that the second signal did occur during the predetermined time period then the switching circuit 60 will be triggered and an output signal on an output conductor 64 will be used to enable a remote control signal.

The timing circuit 62 is operated to establish a predetermined time interval, as for example, 1.5 seconds. In this case, if the operator of the vehicle first switches the high beam signal to an on condition, by following the circuit of FIG. 2, it will observed that a trigger signal will be sent both to the switching circuit 60 and the timing circuit 62. If the operator of the vehicle then actuates the low beam-high beam-low beam switch in the vehicle a second time, a second trigger signal will be sent to the switching circuit 60 and the timing circuit 62. If the second signal occurs within the predetermined time period, as for example, 1.5 seconds, then the switching circuit will be enabled and an output will be generated to the remote control system. On the other hand, if the second switching from the low beam to the high beam to the low beam did not occur within the predetermined time period, then the switching circuit 60 will not be initiated.

A resistive-capacitor circuit 68 is connected to the switching circuit 50 in order to create a delay in the operation of the switching circuit when power is first initiated to the system. This will insure that all of the circuits 56, 58, 60 and 62 are powered in a known state. The resistive-capacitive circuit 68 is comprised of a resistor 70 connected to a five volt power source, such as the power of the vehicle and a grounded capacitor 72, as illustrated in FIG. 2 of the drawings.

The various circuits 56, 58, 60 and 62 are all generally one shots and more particularly, dual re-triggerable monostable multivibrators. Multivibrators of this type are offered by National Semiconductor Corporation under Model No. MM54HC423A and MM74HC423A. These multivibrators generally use silicon gate technology and may be triggered repeatedly while outputs are generating pulses.

The present invention has been designed for and is highly effective for use with automotive vehicles such as passenger automotive vehicles. However, the apparatus of the invention is highly effective for use in trucks and other road vehicles. In addition, this invention is also effective for use in other types of vehicles which are capable of switching between two conditions. In this case, the circuit of the invention is capable of sensing a switching between any two or more conditions such that it will sense between a first condition and a second condition and a switching from the second condition back to the first condition.

FIG. 4 illustrates a slightly modified form of control circuit which may be used in the remote control system of the present invention. In this case, the control circuit $C_1$, which is illustrated in FIG. 4, is very similar to the control circuit C of FIG. 2, except that a control circuit $C_1$, employs a pair of monostable multivibrators 80 and 82, along with an OR gate 84, in place of the trigger circuit 58. Further, and in this case, the monostable multivibrators 80 and 82, along with the OR gate 84, operate as a trigger circuit 86.

Referring more specifically to FIG. 4, it can be observed that the first multivibrator 80 receives an "A" input from the debounding circuit 56. The second monostable multivibrator 82 also receives the same debouncing input from the debouncing circuit 56 at a "B" terminal thereof. The "Q" terminal of the monostable multivibrator 80 and the "Q" terminal of the monostable multivibrator 82 are both connected to an OR gate 84. The output of the OR gate is then connected to the switching circuit and the timing circuit 62. Beyond this, the circuit arrangement as illustrated in FIG. 4 is substantially identical to the circuit arrangement illustrated in FIG. 2 of the drawings.

In essence, the control circuit C, is modified over the control circuit C in order to operate on a high-low beam transition or a low-high beam transition by replacement of the original trigger circuit. However, in this case, the circuit 86 does function as a type of trigger circuit. In the circuit system $C_1$ the first monostable multivibrator 80 operates on either a low beam to a high beam transition. The second monostable multivibrator 82 will operate on the other of the low to high beam or high to low beam transition. Thus, if the monostable multivibrator 80 operates on a low to high beam transition then the monostable multivibrator 82 will operate on a high beam to a low beam transition. The outputs are combined in the OR gate 84 so that either monostable multivibrator will trigger the remaining portions of the circuit in the same manner as described in connection with the circuit C of FIG. 2. The operation of the trigger circuit 86 and particularly at the OR gate 84 thereof can be best illustrated by the following Truth Table:

| INPUT | | |
|---|---|---|
| A | B | OUTPUT |
| 0 | 0 | 0 |
| 0 | 1 | 1 |
| 0 | 1 | 1 |
| 1 | 1 | 1 |

It can be seen that if either input is at a high level then the output is also high. However, if neither input is high then the output must also be low.

Thus, there has been illustrated and described a unique and novel remote control system and an apparatus for performing remote control functions using the headlight system of a vehicle. The present invention thereby fulfills all of the objects and advantages which have been sought. It should be understood that many changes, modifications, variations and other uses and applications will become apparent to those skilled in the art after considering this specification and the accompanying drawings. Therefore, any and all such changes, modifications, variations, and other uses and applications which do not depart from the spirit and scope of the invention are deemed to be covered by the invention.

Having thus described the invention, what I desire to claim and secure by letters patent is:

1. Apparatus for performing a remote function using the headlights of a vehicle having a headlight system with a high beam operation and with a low beam operation, said apparatus comprising;

a) a circuit having beam state detecting means for detecting a low beam or high beam operation of the headlight system of a vehicle, b) said circuit also having means for detecting of one or more switching sequences from a first state of a low beam or high beam to a second state constituting the other of the low beam or high beam states and back to the first state in the headlight system of the vehicle, c) timing means in said circuit to determine if the one or more switching sequences occurred within a predetermined time period and causing the generation of a remote control output signal if the one or more switching sequences occurred in the predetermined time period, and d) means for interposing the circuit between the electrical system of the vehicle and the headlight system to enable the circuit to be powered by the electrical system of the vehicle and to generate a remote control output signal for control of remotely located equipment.

2. The apparatus of claim 1 further characterized in that said apparatus comprises an adapter capable of being interposed between the electrical conductors on a head lamp of a vehicle and a plug of the circuitry of the vehicle manually adapted to receive the conductors on the head lamps.

3. The apparatus of claim 2 further characterized in that said plug has receptacles to receive the conductors of the head lamp and said adapter comprises:

a) receptacle to receive the conductors of the head lamp, and, b) conductors to extend into the receptacle of the plug.

4. The apparatus of claim 1 further characterized in that the vehicle is an automotive vehicle.

5. The apparatus of claim 1 further characterized in that said circuit means for detecting comprise a single switching sequence from a first state of a high beam or a low beam condition to a second state constituting the other of the high beam or low beam condition and back to the first state.

6. The apparatus of claim 1 further characterized in that said circuit means for detecting comprise a first switching sequence from a first state of a high beam on a low beam condition to a second state constituting the other of the high beam or low beam condition and back to the first state and a second switching sequence from the first state back to the second state again and back to the first state again.

7. A circuit for enabling remote actuation of remotely controlled equipment by the switching from low beam to high beam or high beam to low beam operation of the headlight system of a vehicle, said circuit comprising:

a) a triggering circuit for detecting one or more switching sequences between a first state of a high beam or low beam to a second state constituting the other of the low beam and high beam states and back to the first state of the headlight system, b) a timing circuit operatively connected to the triggering circuit and receiving an output from the triggering circuit, said timing circuit initiating a timing operation on receipt of a signal from the triggering circuit, c) a switching circuit also operatively connected to the triggering circuit and receiving an output from the triggering circuit, and d) means connecting an output of the timing circuit to the triggering circuit to enable the triggering circuit to generate a remote control output if the switching between the high beam and low beam operation occurred in a predetermined time interval established by the timing circuit.

8. The circuit of claim 7 further characterized in that the switching circuit receives the same output from the triggering circuit as does the timing circuit.

9. The circuit of claim 7 further characterized in that the triggering circuit receives an input from a filter circuit which receives a beam signal from the vehicle and filters same.

10. The circuit of claim 7 further characterized in that said timing circuit and said switching circuit both comprise multistable multivibrators.

11. The circuit of claim 10 further characterized in that said triggering circuit also comprises a multistable multivibrator.

12. The circuit of claim 7 further characterized in that said circuit is located in an adapter and said adapter is capable of being interposed between the electrical conductors on a head lamp of a vehicle and a plug of the circuitry of a vehicle normally adapted to receive the conductors on the head lamp.

13. The circuit of claim 12 further characterized in that said plug has receptacles to receive the conductors of the head lamp and said adapter comprises:

a) receptacles to receive the conductors of the head lamp, and, b) conductors to extend into the receptacle of the plug.

14. The apparatus of claim 12 further characterized in that the vehicle is an automotive vehicle.

15. The apparatus of claim 7 further characterized in that said circuit means for detecting comprises a single first switching sequence from a first state of a high beam or a low beam condition to a second state constituting the other of the high beam or low beam condition and back to the first state.

16. The apparatus of claim 7 further characterized in that said circuit means for detecting comprises a first switching sequence from a first state of a high beam or a low beam condition to a second state constituting the other of the high beam or low beam condition and back to of the first state and a second switching sequence from the first state back to the second state again and back to the first state again.

17. A method for enabling remote actuation of remotely controlled equipment through one or more switching sequences of a high beam to a low beam or a low beam to a high beam in the headlight system of a vehicle, said method comprising:

a) detecting one or more switching sequences of a first state of a high beam or low beam to a second state constituting the other of the high beam or low beam and back to the first state in the headlight system of a vehicle, b) initiating a timing operation on receipt of a signal detecting a switching from a first beam state to a second beam state and back to a first beam state constituting a switching sequence, and c) starting the initiation of a switching circuit upon receipt of a triggering signal representing a switching sequence, and generating a timing signal enabling a remote control signal output if the signal from the triggering circuit representing a switching sequence occurred within a predetermined time period.

18. The method of claim 17 further characterized in that the method comprises interposing the circuit between the conductors on a head lamp of a vehicle and a plug of that vehicle normally adapted to receive the conductors of the head lamp.

19. The method of claim 17 further characterized in that said method comprises detecting a single switching sequence from a first state of a high beam or low beam condition to a second state constituting the other of the high beam or low beam direction and back to the first state.

20. The method of claim 17 further characterized in that said method comprises detecting comprise a single switching sequence from a first state of a high beam or a low beam condition to a second state constituting the other of the high beam or low beam condition and back to the first state and a second switching sequence from the first state back to the second state again and back to the first state again.

* * * * *